(12) United States Patent
Ren et al.

(10) Patent No.: US 9,609,002 B2
(45) Date of Patent: Mar. 28, 2017

(54) MEDIA CONTENT SYSTEM UTILIZING USER SPONSORED DATA

(71) Applicant: Verizon Patent and Licensing Inc., Arlington, VA (US)

(72) Inventors: Dahai Ren, Lincoln, MA (US); Ming Chen, Bedford, MA (US)

(73) Assignee: VERIZON PATENT AND LICENSING INC., Basking Ridge, NJ (US)

( * ) Notice: Subject to any disclaimer, the term of this patent is extended or adjusted under 35 U.S.C. 154(b) by 13 days.

(21) Appl. No.: 14/831,082

(22) Filed: Aug. 20, 2015

(65) Prior Publication Data

US 2017/0054737 A1    Feb. 23, 2017

(51) Int. Cl.
*H04L 29/06* (2006.01)

(52) U.S. Cl.
CPC .......... *H04L 63/123* (2013.01); *H04L 63/083* (2013.01)

(58) Field of Classification Search
CPC .......................... H04L 63/123; H04L 63/083
See application file for complete search history.

(56) References Cited

U.S. PATENT DOCUMENTS

| | | | | |
|---|---|---|---|---|
| 2011/0054990 A1* | 3/2011 | Bogdan | ................. | G06Q 30/02 705/14.17 |
| 2014/0359069 A1* | 12/2014 | Matute | ................. | H04W 12/08 709/218 |
| 2015/0024709 A1* | 1/2015 | Shan | .................... | H04M 15/09 455/407 |
| 2015/0106907 A1* | 4/2015 | Chawla | ................. | G06Q 50/24 726/9 |
| 2015/0121547 A1* | 4/2015 | Hafeez | ................... | G06F 21/10 726/28 |

* cited by examiner

*Primary Examiner* — Hadi Armouche
*Assistant Examiner* — Hee Song

(57) ABSTRACT

A system may receive a request to access user sponsored media content ("media content"), the request including a digital token ("token"), the media content being associated with a user sponsored account ("account"), and the account being associated with unused data from a mobile communications service plan, where the account and the mobile communications service plan are associated with a user. The system may identify token information included in the token. The system may compare the token information with stored token information. The system may determine that the token is valid based on the token information matching the stored token information. The system may provide access to the media content based on the token being valid. The system may provide information to cause data charges, for traffic flow associated with access to the media content, to be charged against the unused data associated with the account.

20 Claims, 16 Drawing Sheets

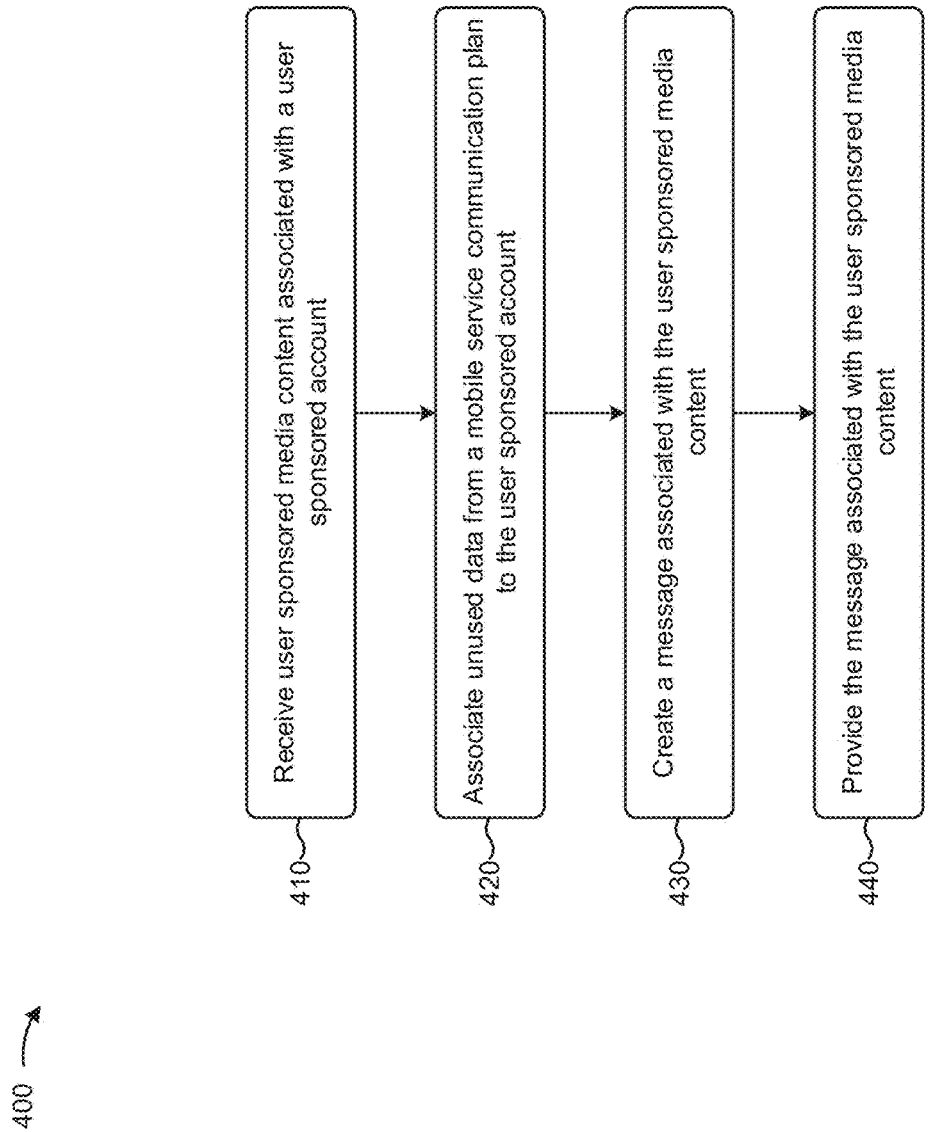

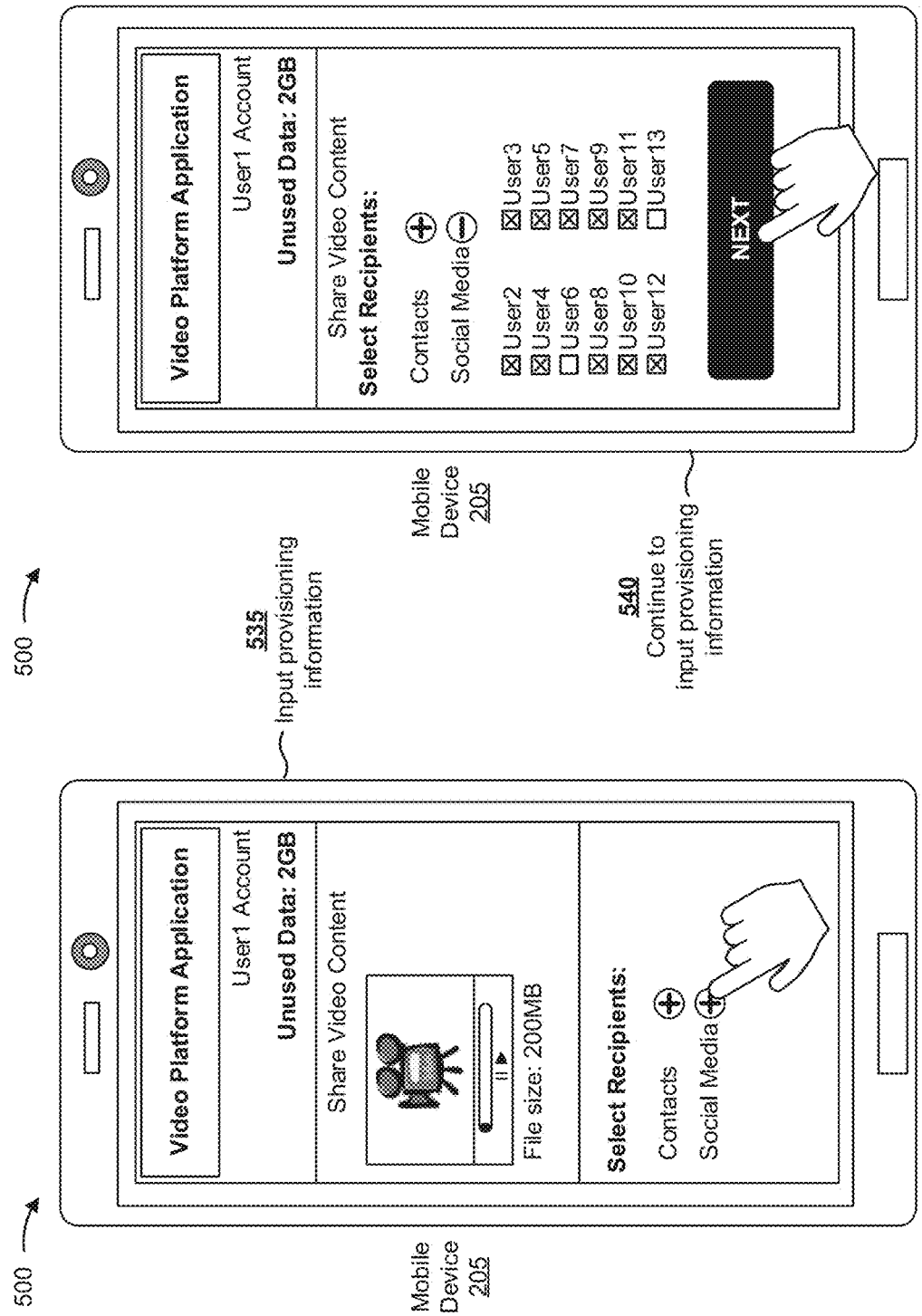

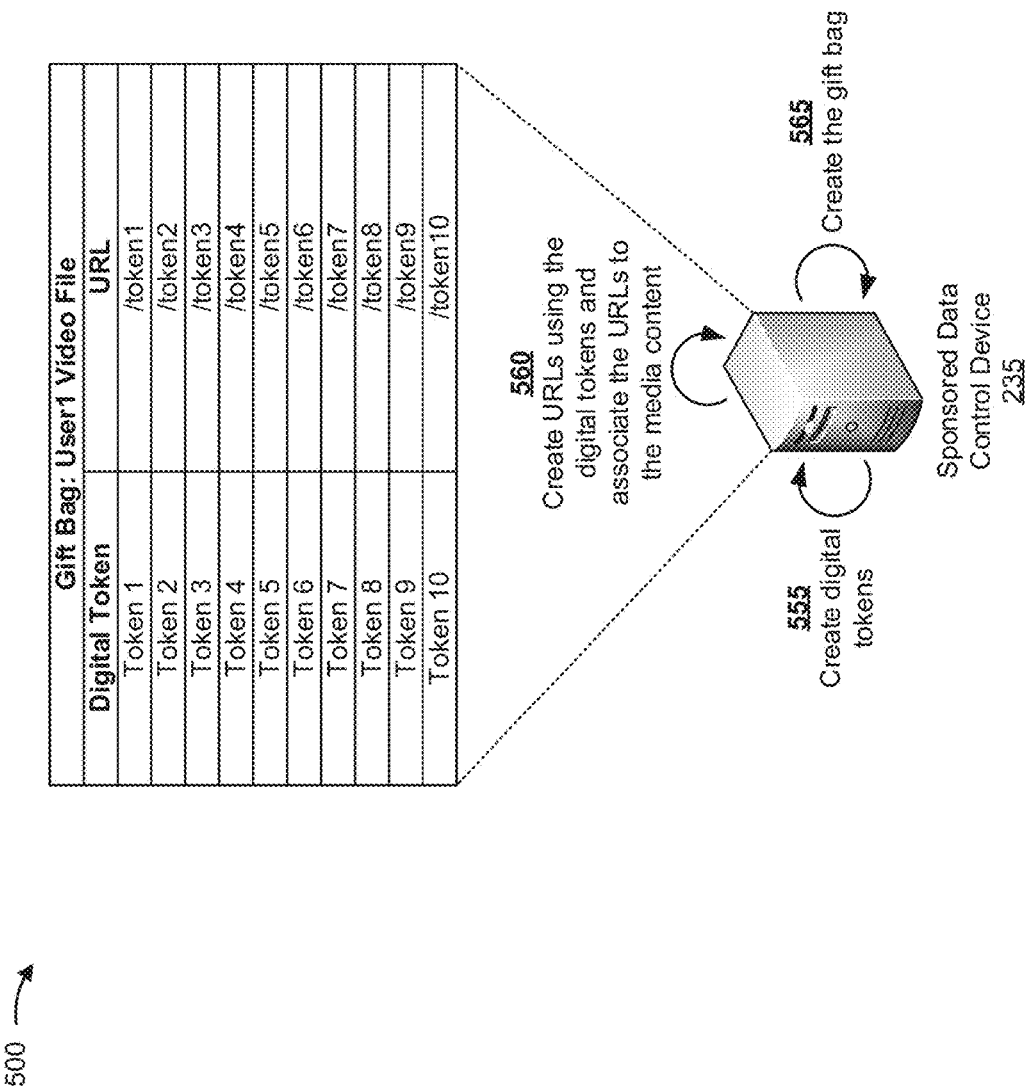

MEDIA CONTENT SYSTEM UTILIZING USER SPONSORED DATA

BACKGROUND

Service providers of mobile communications offer a variety of service plans related to mobile communications services (e.g., talk minutes, texts, data, etc.). Users of the mobile communications services (e.g., customers of the service providers) pay a fee (e.g., a monthly fee) for access to the service plans.

BRIEF DESCRIPTION OF THE DRAWINGS

FIG. 4 is a flow chart of an example process for creating a message to share user sponsored media content;

FIGS. 5A-5J are diagrams of an example implementation relating to the example process shown in FIG. 4;

DETAILED DESCRIPTION OF PREFERRED EMBODIMENTS

The following detailed description of example implementations refers to the accompanying drawings. The same reference numbers in different drawings may identify the same or similar elements.

Service providers of mobile communications services may provide a set quantity of mobile communications services (e.g., a set quantity of minutes, a set quantity of texts, a set quantity of data, etc.) for a fee (e.g., a monthly fee). Some service providers may require the users to use/consume the set quantity of the mobile communications services, during a set period of time (e.g., a month), and may deny the user to carry over (e.g., roll-over) any unused quantity of the mobile communications services to a future period of time (e.g., unused minutes/data may not be carried over to a following billing cycle). These users may end up paying for mobile communications services not used/consumed, as these users are required to pay the fee, regardless of whether the user used/consumed the quantity of mobile communications services entirely, during the set period of time.

Other service providers may permit the unused quantity of the mobile communications services to be carried to a future period of time. However, some users may not change their usage/consumption pattern in these situations (e.g., a user may generally use/consume only 500 megabytes (MB) out of a 1 gigabyte (GB)/month mobile communications service plan each month). These users do not realize any benefit from being able to carry over unused data to a future period of time (e.g., users, whose usage/consumption pattern does not vary, will not consume 1.5 GB of data (a mobile communications services plan with 1 GB/month of data +500 MB of roll-over data) in a future billing cycle, benefiting from the roll-over data).

Additionally, a service provider may reserve bandwidth in a service provider network for the quantity of mobile communications service provided/allocated to each user. Network resources, associated with the service provider network, may be negatively impacted based on an inefficient/improper allocation of mobile communications services.

Implementations described herein enable a system to share user sponsored media content, provided by a user sponsored account, with recipient mobile devices, where users of the recipient mobile devices may access the user sponsored media content using an unused quantity of mobile communications services (e.g., an unused quantity of data or unused data) associated with the user sponsored account. The system may share the user sponsored media content using an associated uniform resource locator (URL), included in a message provided to recipients, where the recipients may access the user sponsored media content using the URL.

Figure 1:
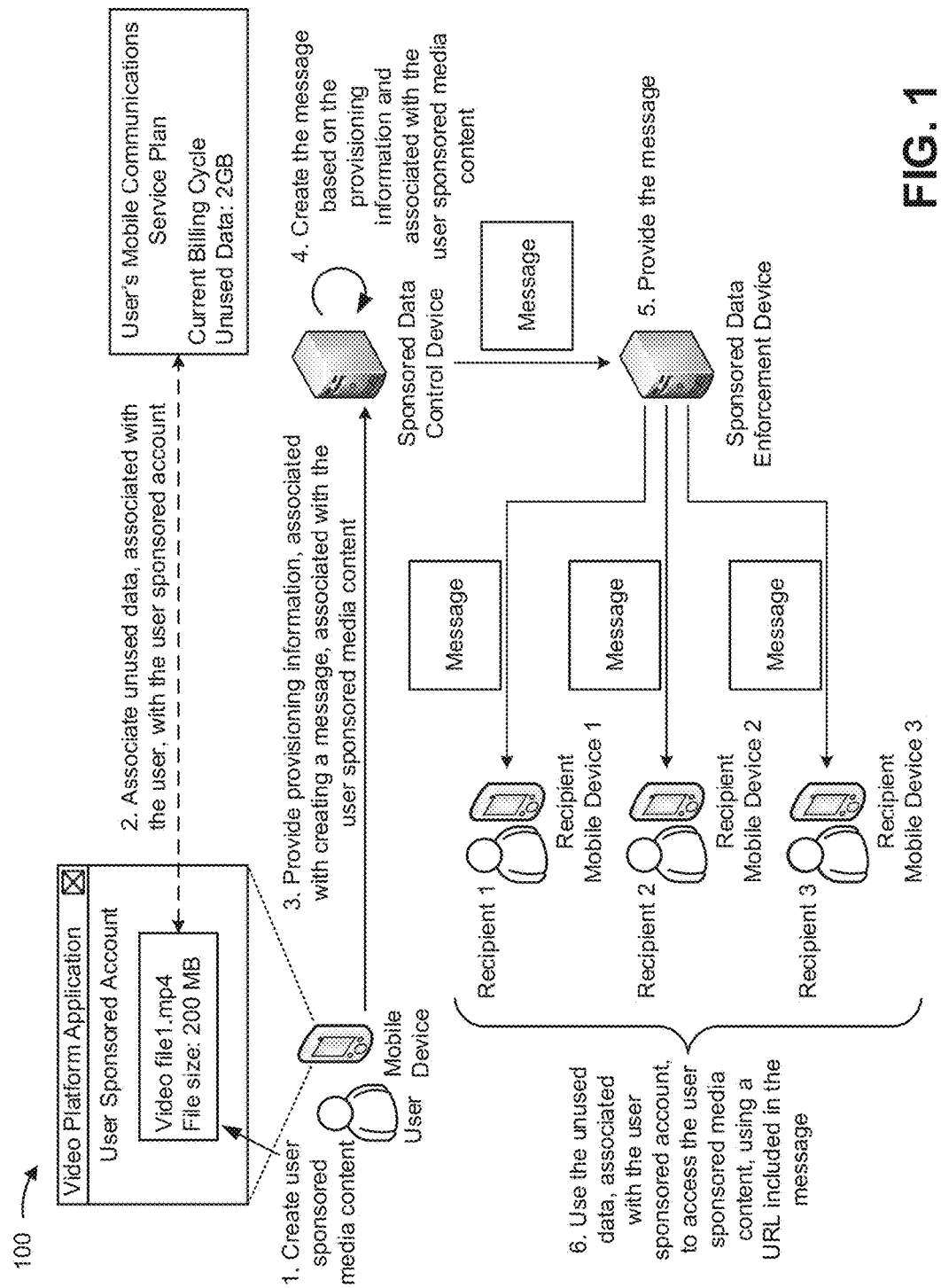
FIG. 1 is a diagram of an overview of an example implementation described herein.

FIG. 1 is a diagram of an overview of an example implementation 100 described herein. As shown in FIG. 1, and by reference number 1, a user of a mobile device may create user sponsored media content (e.g., a video file, Video File 1.mp4, with a file size of 200 MB) for a user sponsored account, using a media platform application (e.g., Video Platform Application), associated with a service provider (e.g., a mobile communications service provider).

As shown in FIG. 1, and by reference number 2, the user of the mobile device may associate unused data, associated with the user of the mobile device, with the user sponsored account (e.g., associate 2 GB of unused data with the user sponsored account), using a sponsored data control device (e.g., Sponsored Data Control Device), associated with the service provider. The unused data is data from a mobile communications service plan, provided by the service provider and associated with the user of the mobile device, which the user of the mobile device does not use/consume during a billing cycle.

As shown in FIG. 1, and by reference number 3, the user may cause the mobile device to provide provisioning information (e.g., names of recipients, a quantity of recipients, a validity period for the recipients to access the user sponsored media content, an amount of unused data available for accessing the user sponsored media content, etc.), associated with creating a message, associated with the user sponsored media content.

As shown in FIG. 1, and by reference number 4, the sponsored data control device may create the message, based on the provisioning information, and may associate the message with the user sponsored media content. As shown in FIG. 1, and by reference number 5, the sponsored data control device may provide the message to users (e.g., Recipient 1, Recipient 2, Recipient 3, etc.) of recipient mobile devices (e.g., Recipient Mobile Device 1, Recipient Mobile Device 2, Recipient Mobile Device 3, etc.), identified in the provisioning information and via a sponsored data enforcement device (e.g., Sponsored Data Enforcement Device).

As shown in FIG. 1, and by reference number 6, the users of the recipient mobile devices may use the unused data, associated with the user sponsored account, to access the user sponsored media content, using a URL included in the message.

In this way, network resources (e.g., the service provider network, the unused data, etc.), associated with the service provider, may be used effectively and efficiently, thereby improving network performance.

While the description to follow focuses on the user sponsored media content being video content (e.g., a video file), the description may also apply to other types of user sponsored media content (e.g., an audio file, an image file, etc.).

Additionally, while the description to follow focuses on a mobile device used to create a user sponsored account and share unused data, a user device (e.g., a laptop, a personal computer, etc.) may also be used, provided that the user of the user device has a mobile communications service plan to associate the unused data with the user sponsored account. The user device may communicate with the sponsored data control device, via a network (e.g., a cellular network, a public land mobile network (PLMN), a local area network (LAN), a wide area network (WAN), a metropolitan area network (MAN), a telephone network (e.g., the Public Switched Telephone Network (PSTN)), a private network, an ad hoc network, a mesh network, an intranet, the Internet, a fiber optic-based network, a cloud computing network, etc.).

Additionally, while the description to follow focuses on a user of the mobile device creating the user sponsored account, users of recipient mobile devices may also create user sponsored accounts and share unused data for accessing user sponsored media content, created/provided by the users of the recipient mobile devices. Additionally, the user of the mobile device may also use unused data associated with another user to access user sponsored media content provided by the other user.

Figure 2:
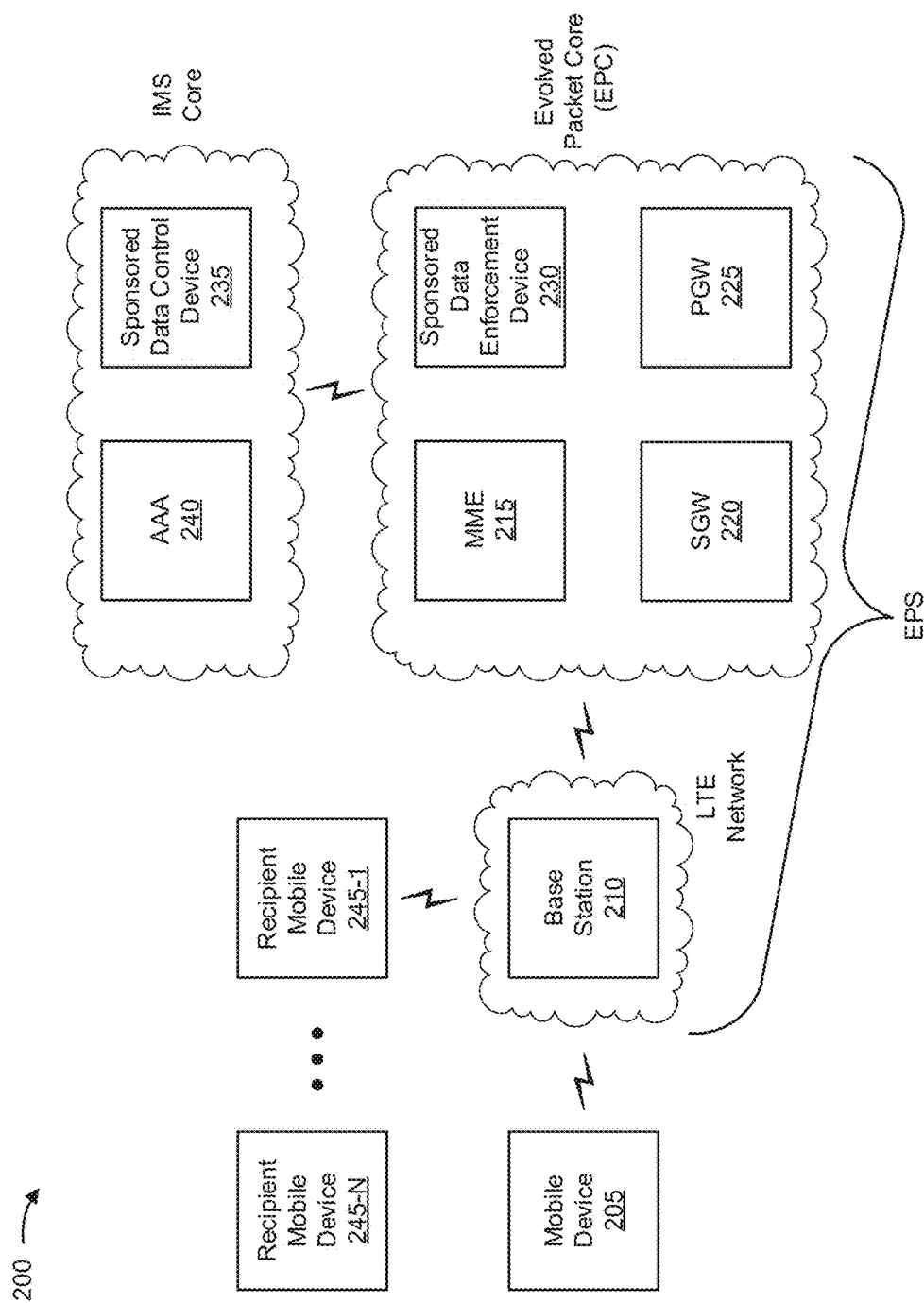
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include mobile device 205; a base station 210; a mobility management entity device (MME) 215; a serving gateway (SGW) 220; a packet data network gateway (PGW) 225; a sponsored data enforcement device 230; a sponsored data control device 235; an authentication, authorization, and accounting server (AAA) 240; and one or more recipient mobile devices 245-1 through 245-N (N≥1) (hereinafter referred to collectively as "recipient mobile devices 245," and individually as "recipient mobile device 245"). Devices of environment 200 may interconnect via wired connections, wireless connect ions, or a combination of wired and wireless connections.

Some implementations are described herein as being performed within a long term evolution (LTE) network for explanatory purposes. Some implementations may be performed within a wireless network that is not an LTE network, such as a third generation (3G) network.

Environment 200 may include an evolved packet system (EPS) that includes an LTE network and/or an evolved packet core (EPC) that operate based on a third generation partnership project (3GPP) wireless communication standard. The LTE network may include a radio access network (RAN) that includes one or more base stations 215 that take the form of evolved Node Bs (eNBs) via which mobile devices 205 communicate with the EPC. The EPC may include MME 215, SGW 220, PGW 225, and sponsored data enforcement device 230 that enable mobile devices 205 to communicate with an Internet protocol (IP) multimedia subsystem (IMS) core. The IMS core may include sponsored data control device 235 and/or AAA 240, and may manage device registration and authentication, session initiation, campaign information, etc., associated with mobile devices 205. Sponsored data control device 235 and/or AAA 240 may reside in the EPC and/or the IMS core.

Mobile device 205 may include one or more devices capable of communicating with base station 210 and/or the LTE network. For example, mobile device 205 may include a wireless communication device, a radiotelephone, a personal communications system (PCS) terminal (e.g., that may combine a cellular radiotelephone with data processing and data communications capabilities), a smart phone, a laptop computer, a tablet computer, a personal gaming system, and/or a similar device. Mobile device 205 may send traffic to and/or receive traffic from the LTE network (e.g., via base station 210, SGW 220, and/or PGW 225).

Base station 210 may include one or more devices capable of transferring traffic, such as audio, video, text, and/or other traffic, destined for and/or received from mobile device 205. In some implementations, base station 210 may include an eNB associated with the LTE network that receives traffic from and/or sends traffic to the network via SGW 220 and/or PGW 225. Additionally, or alternatively, one or more base stations 210 may be associated with a RAN that is not associated with the LTE network. Base station 210 may send traffic to and/or receive traffic from mobile device 205 via an air interface. In some implementations, base station 210 may include a small cell base station, such as a base station of a microcell, a picocell, and/or a femtocell.

MME 215 may include one or more devices, such as one or more server devices, capable of managing authentication, activation, deactivation, and/or mobility functions associated with mobile device 205. In some implementations, MME 215 may perform operations relating to authentication of mobile device 205. Additionally, or alternatively, MME 215 may facilitate the selection of a particular SGW 220 and/or a particular PGW 225 to serve traffic to and/or from mobile device 205. MME 215 may perform operations associated with handing off mobile device 205 from a first base station 210 to a second base station 210 when mobile device 205 is transitioning from a first cell associated with the first base station 210 to a second cell associated with the second base station 210. Additionally, or alternatively, MME 215 may select another MME (not pictured), to which mobile device 205 should be handed off (e.g., when mobile device 205 moves out of range of MME 215).

SGW 220 may include one or more devices capable of routing packets. For example, SGW 220 may include one or more data processing and/or traffic transfer devices, such as a gateway, a router, a modem, a switch, a firewall, a network interface card (NIC), a hub, a bridge, a server device, an optical add/drop multiplexer (OADM), or any other type of device that processes and/or transfers traffic. In some implementations, SGW 220 may aggregate traffic received from one or more base stations 210 associated with the LTE network, and may send the aggregated traffic to the network (e.g., via PGW 225) and/or other network devices associated with the EPC and/or the IMS core. SGW 220 may also receive traffic from the network and/or other network devices, and may send the received traffic to mobile device 205 via base station 210. Additionally, or alternatively, SGW 220 may perform operations associated with handing off mobile device 205 to and/or from an LTE network.

PGW 225 may include one or more devices capable of providing connectivity for mobile device 205 to external packet data networks (e.g., other than the depicted EPC and/or LTE network). For example, PGW 225 may include one or more data processing and/or traffic transfer devices, such as a gateway, a router, a modem, a switch, a firewall, a NIC, a hub, a bridge, a server device, an OADM, or any other type of device that processes and/or transfers traffic. In some implementations, PGW 225 may aggregate traffic received from one or more SGWs 220, and may send the aggregated traffic to the network. Additionally, or alternatively, PGW 225 may receive traffic from the network, and may send the traffic to mobile device 205 via SGW 220 and base station 210. PGW 225 may record data usage information (e.g., byte usage), and may provide the data usage information to AAA 240.

Sponsored data enforcement device 230 may include one or more devices capable of inspecting traffic and applying one or more provisioning rules to the traffic. For example, sponsored data enforcement device 230 may include a gateway, a router, a modem, a switch, a firewall, a NIC, a hub, a bridge, a server, an OADM, or a similar type of device. Sponsored data enforcement device 230 may receive provisioning rules from sponsored data control device 235, may apply the provisioning rules to traffic received from PGW 225, and may instruct PGW 225 how to handle the traffic based on the provisioning rules. Additionally, or alternatively, sponsored data enforcement device 230 may instruct AAA 240 how to charge for data usage associated with the traffic.

Sponsored data control device 235 may include one or more devices capable of receiving, generating, storing, processing, and/or providing information associated with a creating a message, associated with user sponsored media content. For example, sponsored data control device 235 may include a server or a similar type of device. Sponsored data control device 235 may receive user sponsored media content and provisioning information from mobile device 205. Sponsored data control device 235 may create a message based on the provisioning information and associated with the user sponsored media content. Sponsored data control device 235 may generate provisioning rules based on the provisioning information, and may deploy the provisioning rules to one or more sponsored data enforcement devices 230 (e.g., associated with one or more cellular service areas).

AAA 240 may include one or more devices, such as one or more server devices, that perform authentication, authorization, and/or accounting operations for communication sessions associated with mobile device 205. For example, AAA 240 may perform authentication operations for mobile device 205 and/or a user of mobile device 205 (e.g., using one or more credentials), may control access, by mobile device 205, to a service and/or an application (e.g., based on one or more restrictions, such as time-of-day restrictions, location restrictions, single or multiple access restrictions, read/write restrictions, etc.), may track resources consumed by mobile device 205 (e.g., a quantity of voice minutes consumed, a quantity of data consumed, etc.), and/or may perform similar operations.

Recipient mobile device 245 may include one or more devices capable of communicating with base station 210 and/or the LTE network. For example, recipient mobile device 245 may include a wireless communication device, a radiotelephone, a personal communications system (PCS) terminal (e.g., that may combine a cellular radiotelephone with data processing and data communications capabilities), a smart phone, a laptop computer, a tablet computer, a personal gaming system, and/or a similar device. Recipient mobile device 245 may send traffic to and/or receive traffic from the LTE network (e.g., via base station 210, SGW 220, and/or PGW 225).

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
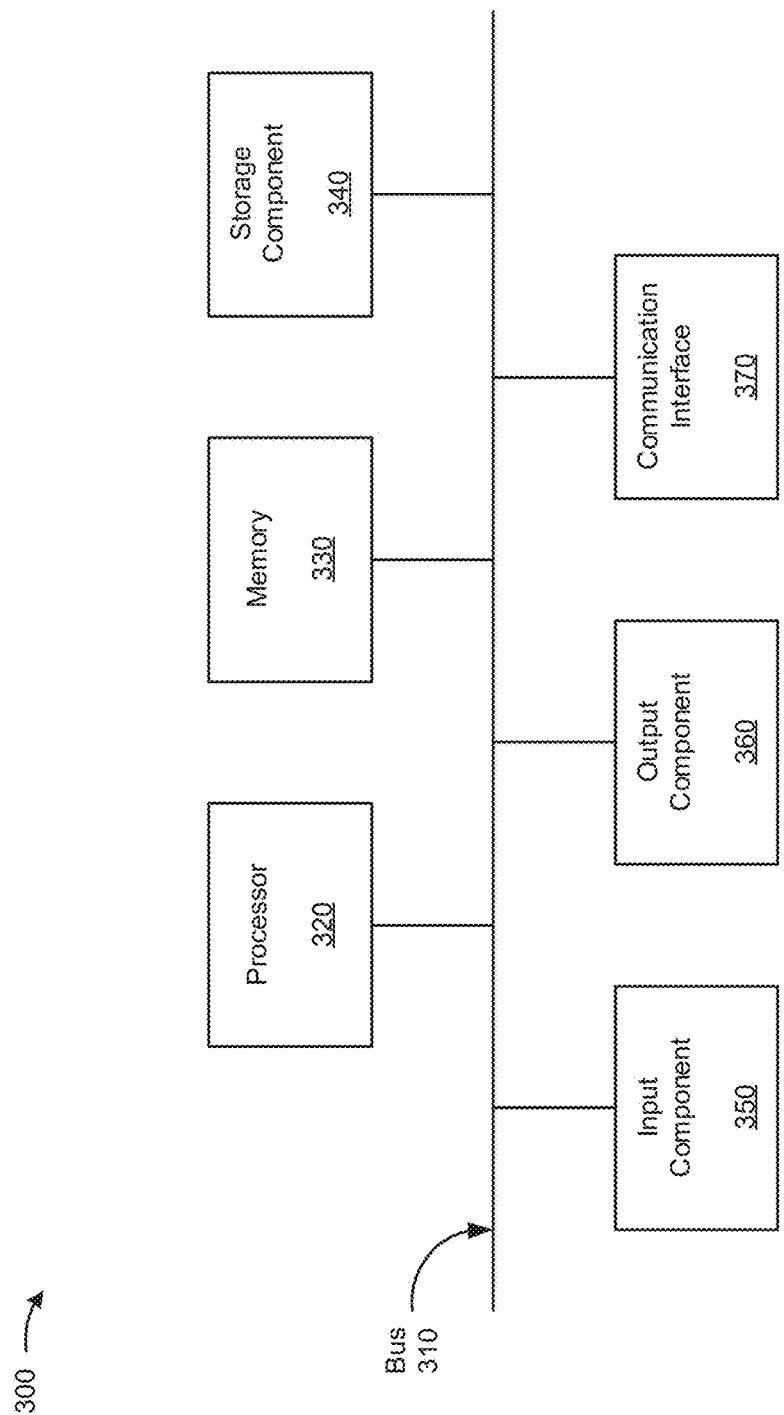
FIG. 3 is a diagram of example components of one or more devices of FIG. 2.

FIG. 3 is a diagram of example components of a device 300. Device 300 may correspond to mobile device 205, base station 210, MME 215, SGW 220, PGW 225, sponsored data enforcement device 230, sponsored data control device 235, AAA 240, and/or recipient mobile device 245. In some implementations, mobile device 205, base station 210, MME 215, SGW 220, PGW 225, sponsored data enforcement device 230, sponsored data control device 235, AAA 240, and/or recipient mobile device 245 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 may include a component that permits communication among the components of device 300. Processor 320 is implemented in hardware, firmware, or a combination of hardware and software. Processor 320 may include a processor (e.g., a central processing unit (CPU), a graphics processing unit (GPU), an accelerated processing unit (APU), etc.), a microprocessor, and/or any processing component (e.g., a field-programmable gate array (FPGA), an application-specific integrated circuit (ASIC), etc.) that can be programmed to perform a function. Memory 330 may include a random access memory (RAM), a read only memory (ROM), and/or another type of dynamic or static storage device (e.g., a flash memory, a magnetic memory, an optical memory, etc.) that stores information and/or instructions for use by processor 320.

Storage component 340 may store information and/or software related to the operation and use of device 300. For example, storage component 340 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive.

Input component 350 may include a component that permits device 300 to receive information, such as via user input (e.g., a touch screen display, a keyboard, a keypad, a mouse, a button, a switch, a microphone, etc.). Additionally, or alternatively, input component 350 may include a sensor for sensing information (e.g., a global positioning system (GPS) component, an accelerometer, a gyroscope, an actuator, etc.). Output component 360 may include a component that provides output information from device 300 (e.g., a display, a speaker, one or more light-emitting diodes (LEDs), etc.).

Communication interface 370 may include a transceiver-like component (e.g., a transceiver, a separate receiver and transmitter, etc.) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

FIG. 4 is a flow chart of an example process 400 for creating a message to share user sponsored media content. In some implementations, one or more process blocks of FIG. 4 may be performed by sponsored data control device 235. In some implementations, one or more process blocks of FIG. 4 may be performed by another device or a group of devices separate from or including sponsored data control device 235, such as mobile device 205, base station 210, MME 215, SGW 220, PGW 225, sponsored data enforcement device 230, AAA 240, and recipient mobile device 245.

As shown in FIG. 4, process 400 may include receiving user sponsored media content associated with a user sponsored account (block 410). For example, a user of mobile device 205 may create a user sponsored account using a media platform application (e.g., Video Platform Application), provided on mobile device 205. To create the user sponsored account, the user of mobile device 205 may provide account information (e.g., a user name, a password, etc.) to a sponsored data control device (e.g., sponsored data control device 235), using mobile device 205.

Additionally, or alternatively, the user of mobile device 205 may obtain media content (e.g., a video file, an audio file, an image file, etc.). In some implementations, the user of mobile device 205 may create the media content using the user sponsored account and/or the media platform application, provided by mobile device 205. In some implementations, the user of mobile device 205 may receive the media content from another device.

Mobile device 205 may provide the media content to use as user sponsored media content to sponsored data control device 235. Sponsored data control device 235 may store the user sponsored media content.

As shown in FIG. 4, process 400 may include associating unused data from a mobile communications service plan to the user sponsored account (block 420). For example, sponsored data control device 235 may receive instructions, from the user of mobile device 205, to associate unused data (e.g., all unused data, some unused data, etc.) from a mobile communications service plan, associated with the user of mobile device 205, with the user sponsored account (e.g., associate 500 MB of unused data of a 2 GB/month mobile communications service plan to the user sponsored account). In some implementations, the user of mobile device 205 may specify a quantity of unused data to associate with the user sponsored account.

As shown in FIG. 4, process 400 may include creating a message associated with the user sponsored media content (block 430). For example, sponsored data control device 235 may receive instructions from the user of mobile device 205 to create a message associated with the user sponsored media content. The message may be used to access the user sponsored media content by multiple recipients.

Additionally, or alternatively, sponsored data control device 235 may receive provisioning information, associated with the message, inputted by the user of mobile device 205 via an interface of mobile device 205. Provisioning information may include a particular way of sharing the message (e.g., via e-mail, via social media, via text message, etc.). In some implementations, sponsored data control device 235 may link an external account, used for sharing the message, to the user sponsored account (e.g., linking a social media account, associated with the user, to the user sponsored account; linking an e-mail program, associated with the user, to the user sponsored account, etc.).

In some implementations, the message may be shared directly from the user sponsored account without linking the user sponsored account to an external account.

The provisioning information may include a quantity of recipients (e.g., users of recipient mobile devices 245) to receive the message (e.g., 5 contacts from a contact list, 10 contacts from a contact list, all contacts from a contact list, etc.). In some implementations, sponsored data control device 235 may receive the identifier, associated with the recipients, from a contacts list associated with the user sponsored account. In some implementations, sponsored data control device 235 may receive the identifier, associated with the recipients, from a contacts list associated with the external account.

The provisioning information may also or alternatively include a validity period for the recipients to access the user sponsored media content (e.g., the user sponsored media content may be accessed for 24 hours after a time the message was provided to the recipient; the user sponsored media content may be accessed for 1 week after a time the message was provided to the recipient; the user sponsored media content may be accessed for 1 month after a time the message was provided to the recipient; etc.).

The provisioning information may also include a variety of additional instructions. For example, the additional instructions may specify that only a recipient of the message, as identified by the provisioning information, may access the user sponsored media content. The additional instructions may specify that the recipient may not broadcast the user sponsored media content associated with the message. The additional instructions may specify that each recipient may only access one URL, included in the message, and associated with the user sponsored media content. These are only a few examples of additional instructions and/or provisioning information and other examples of additional instructions and/or provisioning information may be possible.

Additionally, or alternatively, sponsored data control device 235 may generate provisioning rules, based on the provisioning information. A provisioning rule may specify one or more provisioning conditions for enabling a user of recipient mobile device 245 to access the user sponsored media content associated with the message.

For example, provisioning rules may identify, based on the provisioning information, a valid time period during which a recipient of the message may access the user sponsored media content, using the URL included in the message. Additionally, or alternatively, provisioning rules may identify a quantity of data (e.g., in bytes), based on the provisioning information, to be allocated to the user sponsored account. Additionally, or alternatively, provisioning rules may identify additional instructions, based on the provisioning information, for permitting a recipient of the message to access/use the user sponsored media content using the URL included in the message.

Sponsored data control device 235 may combine the generated provisioning rules into a configuration file, and may provide the configuration file to one or more sponsored data enforcement devices 230 so that the one or more sponsored data enforcement devices 230 may determine whether to permit the recipient of the message access to the user sponsored media content, using the URL included in the message.

Additionally, or alternatively, sponsored data control device 235 may receive authorization to use the unused data to access the user sponsored media content through creating the message, based on the user interacting with an input mechanism on a display of the user device.

Additionally, or alternatively, sponsored data control device 235 may create digital tokens, equal in quantity to the quantity of recipients selected by the user (e.g., create 10 digital tokens based on the provisioning information specifying 10 recipients for the message).

A digital token is an electronic key that may be encrypted and may include token information associated with the media content file (e.g., an identifier for a creator of the user sponsored media content, a mobile directory number (MDN), an identifier associated with the user sponsored media content, the quantity of unused data associated with the user sponsored account, the validity period for accessing the user sponsored media content, etc.). The digital token may be encrypted using an encryption algorithm (e.g., a hash-based message authentication code-secure hash algorithm (HMAC-SHA) 256).

Sponsored data control device 235 may create the digital tokens as signing key pairs. Additionally, or alternatively, sponsored data control device 235 may create uniform resource locators (URLs), equal in quantity to the quantity of digital tokens, where each URL may include a digital token.

Additionally, or alternatively, sponsored data control device 235 may associate the media content with each URL created. Additionally, or alternatively, sponsored data control device 235 may create the message for distribution to the recipients (e.g., users of recipient mobile device 245). The message may include a URL. Additionally, or alternatively, sponsored data control device 235 may store the signing key pairs, including the token information. In some implementations, sponsored data control device 235 may provide the digital token, including the token information, to sponsored data enforcement device 230. In some implementations, sponsored data control device 235 may provide the signing key pair, including the token information, to sponsored data enforcement device 230.

As shown in FIG. 4, process 400 may include providing the message associated with the user sponsored media content (block 440). For example, sponsored data control device 235 may provide the message to the recipients (e.g., users of recipient mobile devices 245), via sponsored data enforcement device 230, to share the user sponsored media content.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

FIGS. 5A-5J are diagrams of an example implementation 500 relating to example process 400 shown in FIG. 4. FIGS. 5A-5J show an example of a process for creating a message to share user sponsored media content.

Figure 5A:
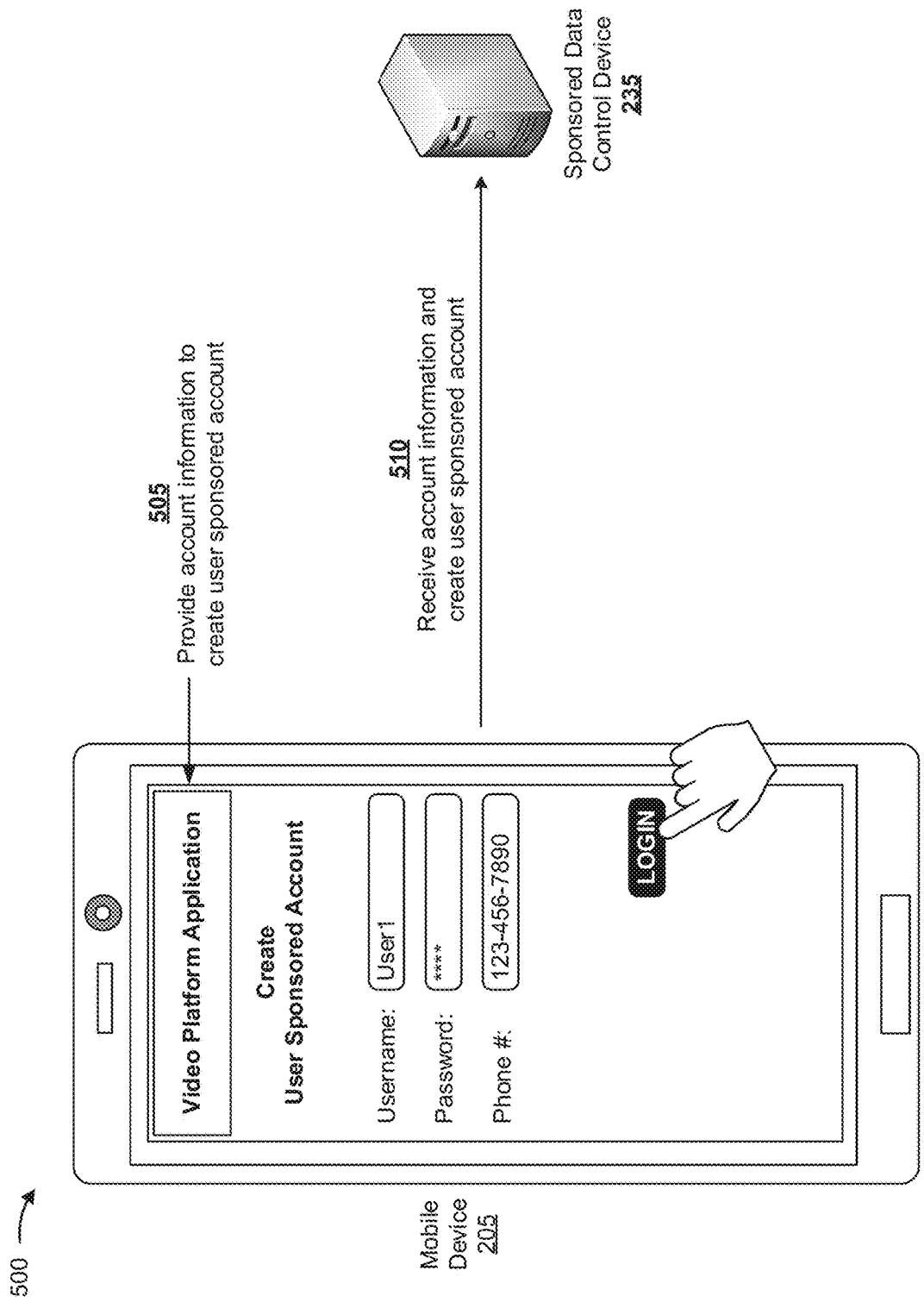

As shown in FIG. 5A, assume a user of a mobile communications service has unused data (e.g., 2 GB of unused data during a billing cycle associated with a mobile communications service plan).

As shown in FIG. 5A, and by reference number 505, a user of a mobile device (e.g., mobile device 205) provides account information to create a user sponsored account (e.g., User Sponsored Account), via a media platform application (e.g., Video Platform Application), provided on mobile device 205. The media platform application and/or the user sponsored account is associated with a service provider (e.g., a mobile communications service provider).

As shown in FIG. 5A, and by reference number 510, sponsored data control device 235, associated with the service provider, receives the account information and creates the user sponsored account.

Figure 5B:
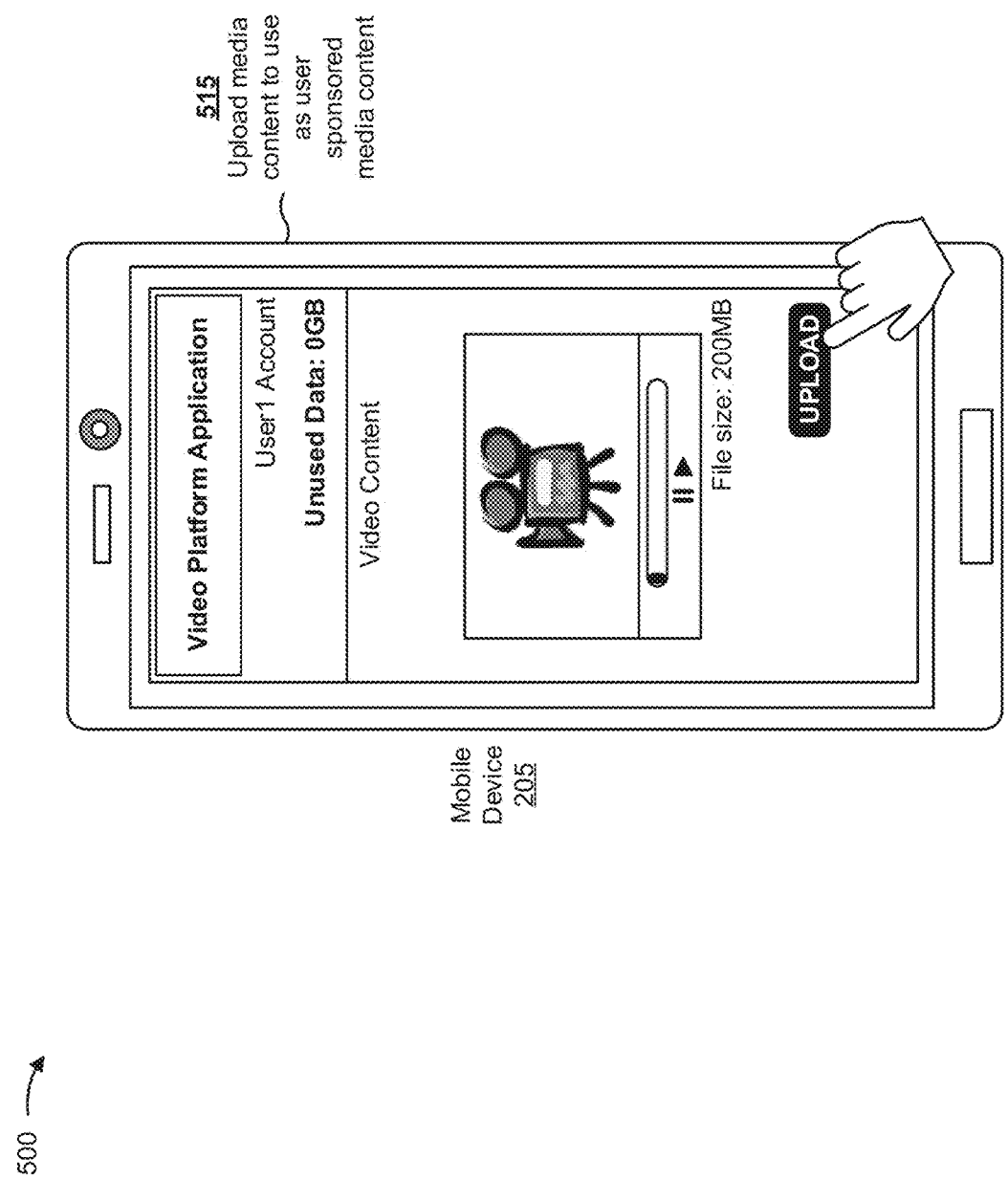
Figure 5C:
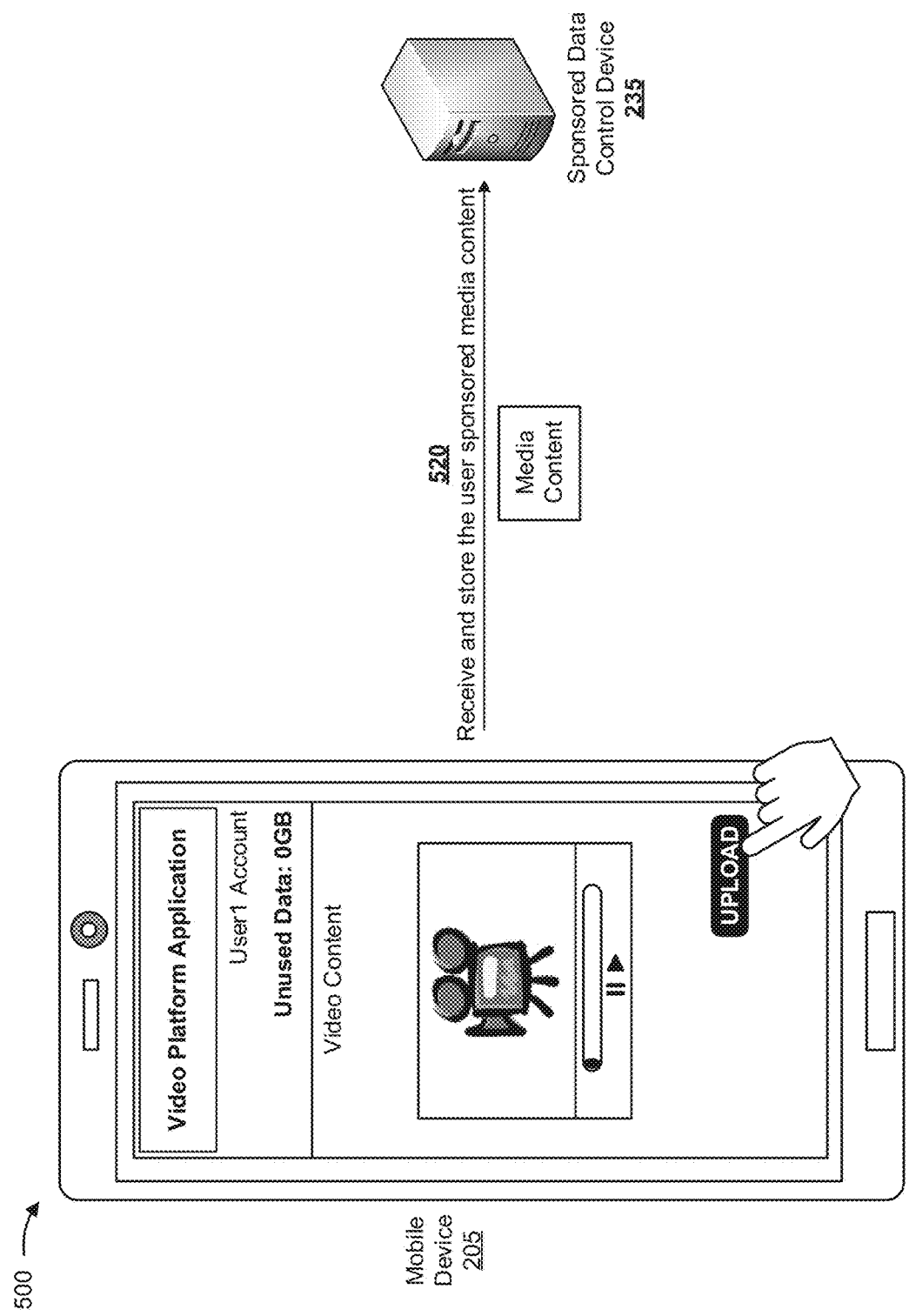

As shown in FIG. 5B, and by reference number 515, the user may upload media content using the media platform application to sponsored data control device 235 to use as user sponsored media content. As shown in FIG. 5C, and by reference number 520, sponsored data control device 235 receives and stores the user sponsored media content.

Figure 5D:
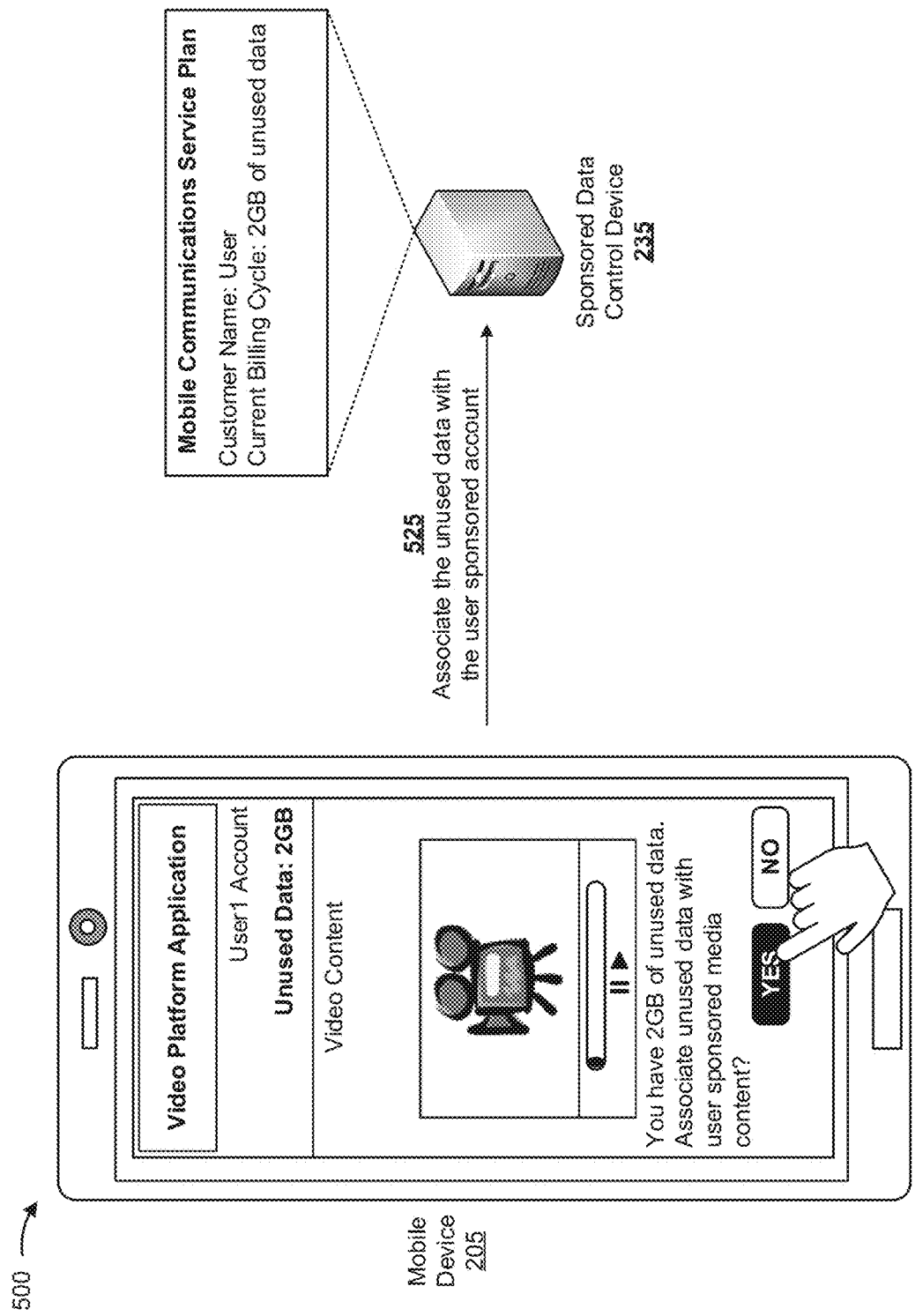
Figure 5E:
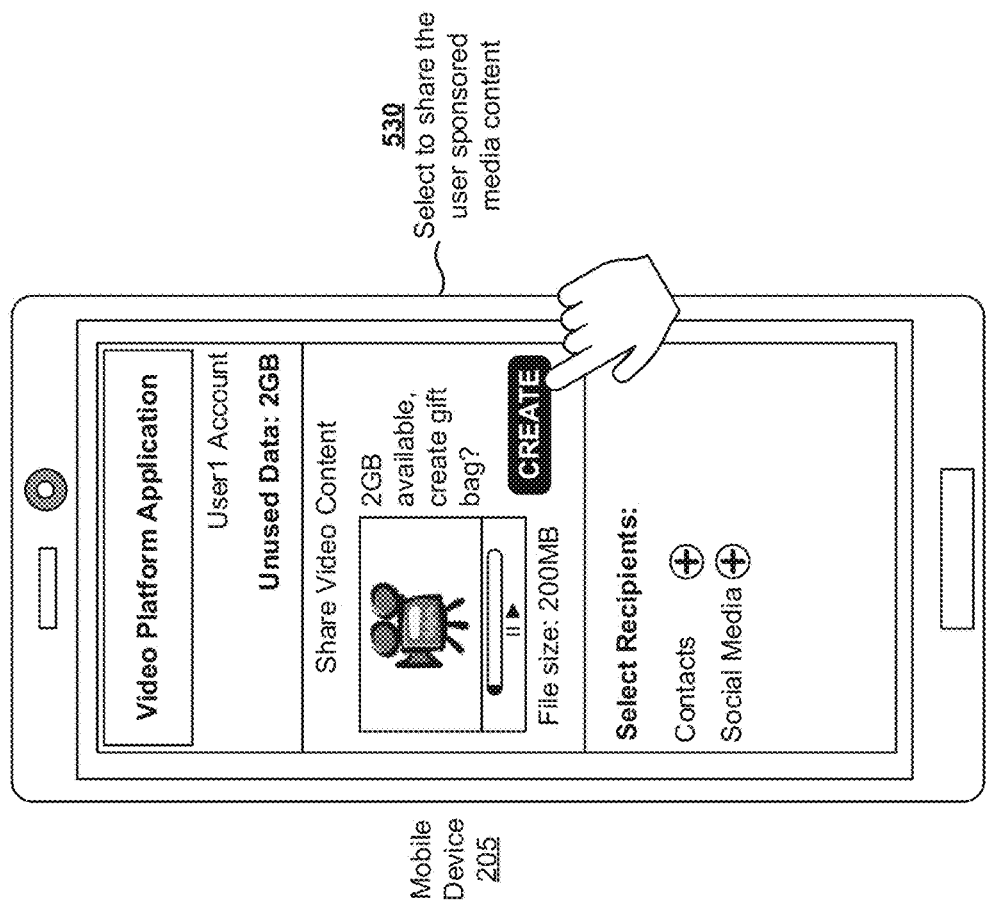

As shown in FIG. 5D, and by reference number 525, sponsored data control device 235 associates the unused data with the user sponsored account, based on instructions received by the user of mobile device 205 to associate the unused data with the user sponsored account (e.g., associate the 2 GB of unused data available from a mobile communications service plan, associated with the user of mobile device 205, with the user sponsored account). As shown in FIG. 5E, and by reference number 530, the user of mobile device 205 selects to share the user sponsored media content (e.g., a gift bag that includes a URL, associated with the user sponsored media content, that may be used to access the user sponsored media content by multiple recipients), by interacting with an input mechanism.

As shown in shown in 5F, and by reference number 535, the user inputs provisioning information to mobile device 205 to share the user sponsored media content in a particular way (e.g., via social media).

As shown in FIG. 5G, and by reference number 540, the user continues to input provisioning information to mobile device 205, by providing one or more identifiers, associated with users of recipient mobile devices 245 (e.g., User2, User3, User4, etc.).

Figure 5H:
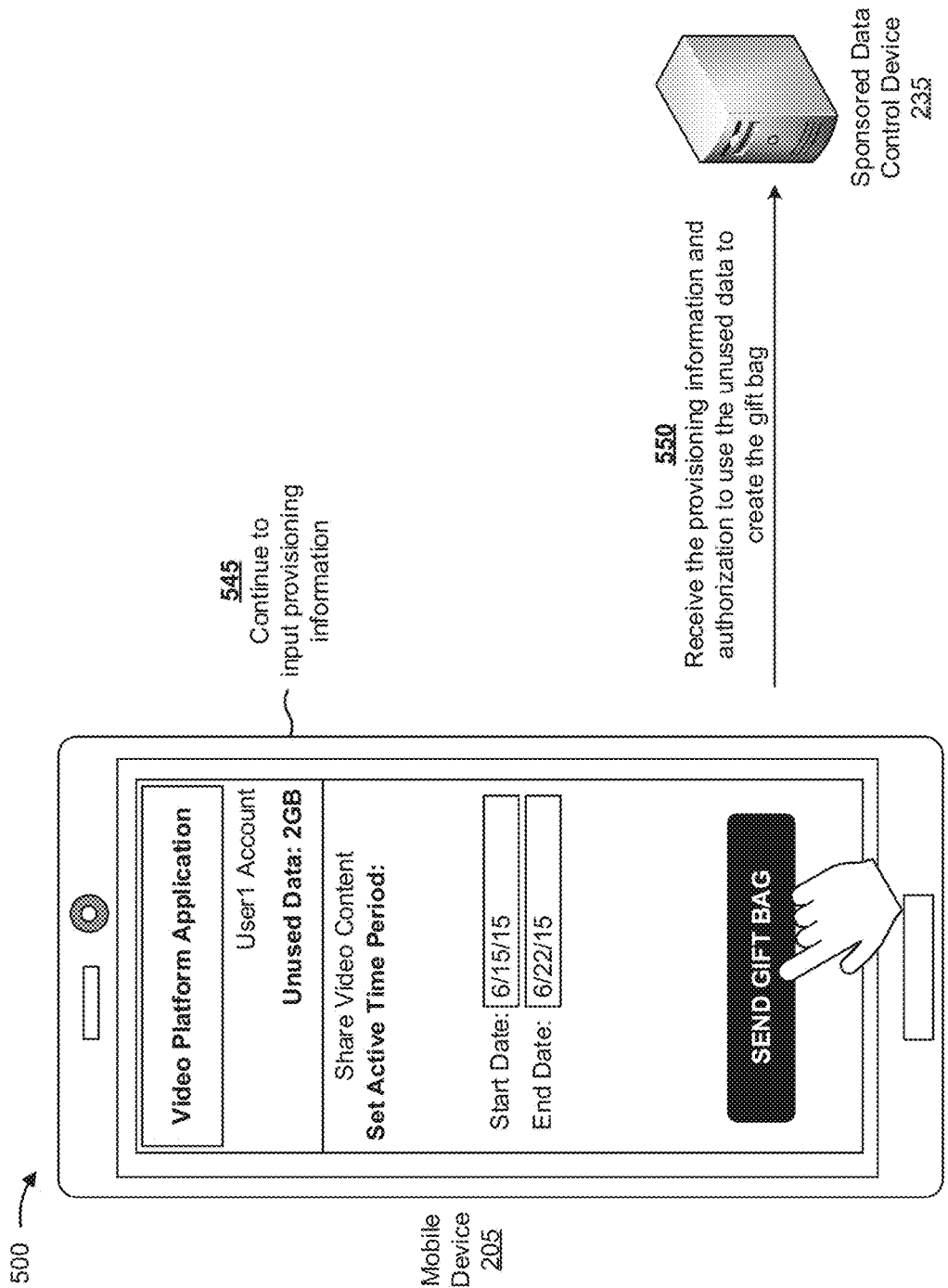

As shown in FIG. 5H, and by reference number 545, the user continues to input provisioning information to mobile device 205, by providing a valid time period for recipients to access the user sponsored media content (e.g. an active time period for recipients to access the user sponsored media content with a start date=6/15/15 and an end date=6/22/15).

As shown in FIG. 5H, and by reference number 550, sponsored data control device 235 receives the provisioning information and authorization to use the unused data to create the gift bag, based on the user interacting with an input mechanism on mobile device 205 (e.g., the user clicks a "Send Gift Bag" button).

As shown in FIG. 5I, and by reference number 555, sponsored data control device 235 creates digital tokens (e.g., Token 1, Token 2, Token 3, etc.), equal in quantity to the quantity of recipients selected by the user, including token information. As shown in FIG. 5I, and by reference number 560, sponsored data control device 235 creates URLs (e.g., /token 1, /token 2, /token 3, etc.) using the digital tokens (e.g., /token 1 including Token 1, /token 2 including Token 2, /token 3 including Token 3, etc.) and associates the URLs with the user sponsored media content. As shown in FIG. 5I, and by reference number 565, sponsored data control device 235 creates the gift bag, including the URLs.

Figure 5J:
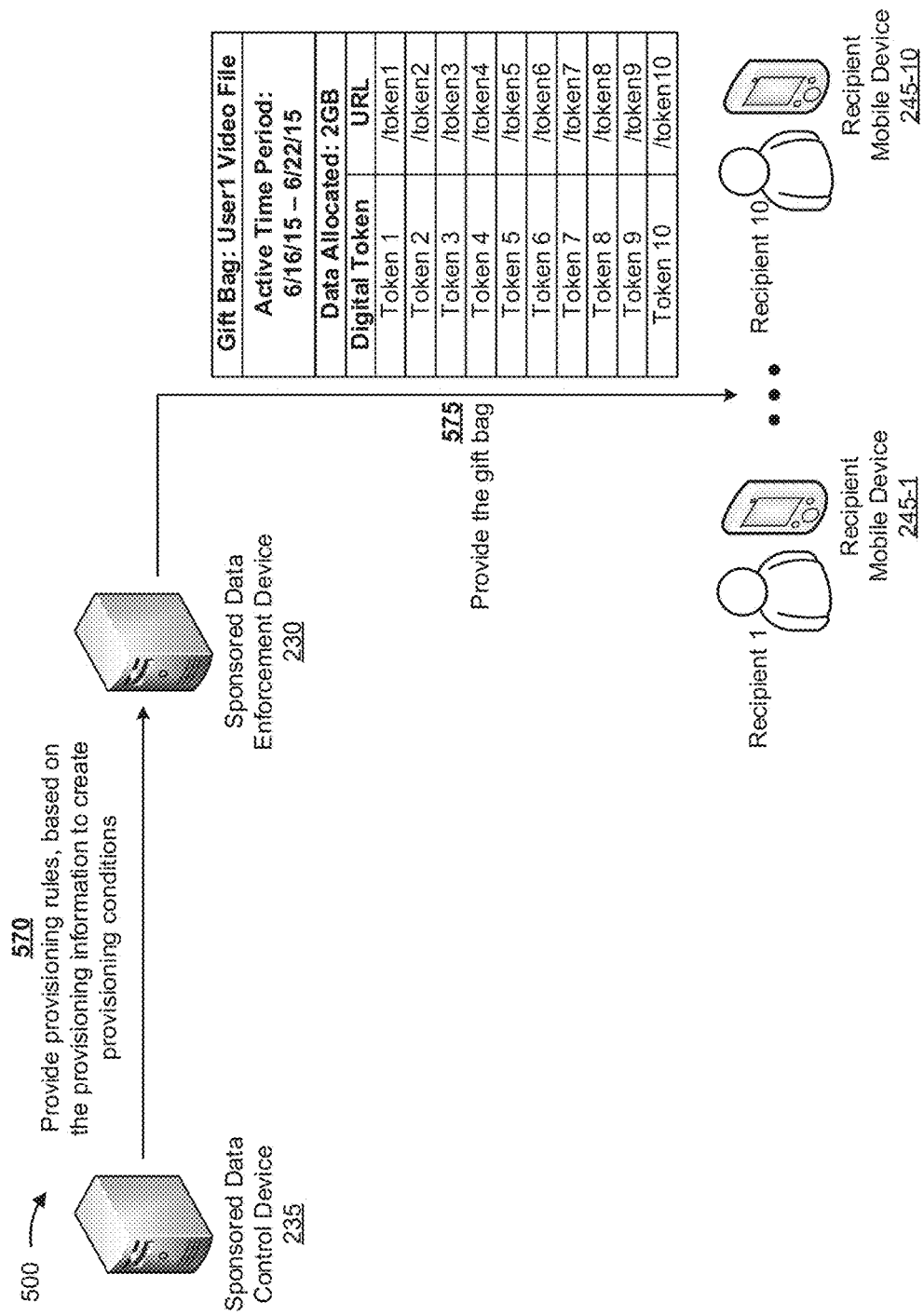

As shown in FIG. 5J, and by reference number 570, sponsored data control device 235 provides provisioning rules, based on provision information to create provisioning conditions, to sponsored data device 230. As shown in FIG. 5J, and by reference number 575, sponsored data control device 235 provides the gift bag, in the form of a message, to users of recipient mobile devices 245 (e.g., Recipient 1 of Recipient Mobile Device 245-1, Recipient 10 of Recipient Mobile Device 245-10, etc.), via sponsored data enforcement device 230.

As indicated above, FIGS. 5A-5J are provided merely as an example. Other examples are possible and may differ from what was described with regard to FIGS. 5A-5J.

Figure 6:
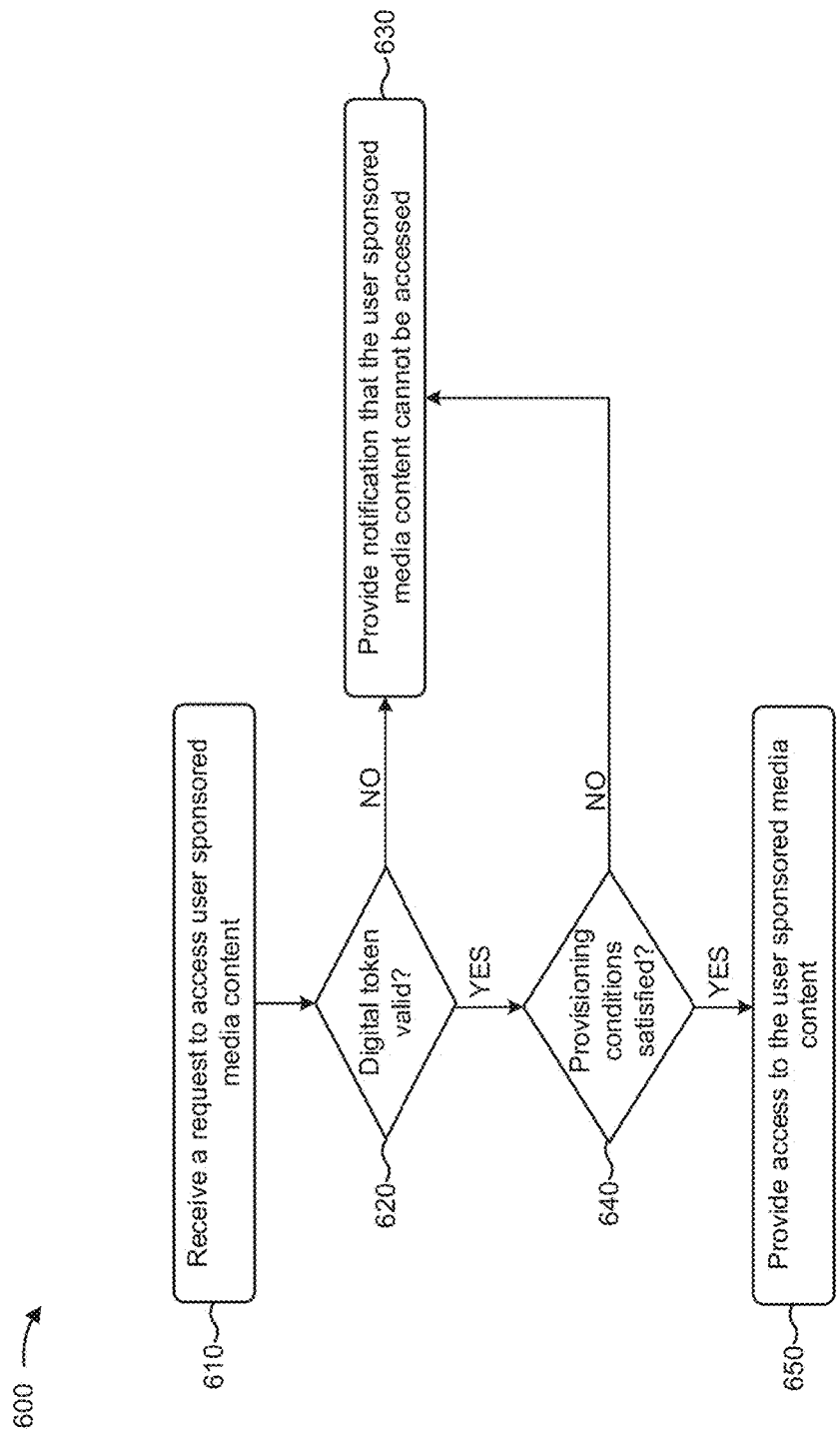
FIG. 6 is a flow chart of an example process for accessing user sponsored media content.

FIG. 6 is a flow chart of an example process 600 for accessing user sponsored media content. In some implementations, one or more process blocks of FIG. 6 may be performed by sponsored data enforcement device 230. In some implementations, one or more process blocks of FIG. 6 may be performed by another device or a group of devices separate from or including sponsored data enforcement device 230, such as mobile device 205, base station 210, MME 215, SGW 220, PGW 225, sponsored data control device 235, AAA 240, and recipient mobile device 245.

As shown in FIG. 6, process 600 may include receiving a request to access user sponsored media content (block 610). For example, a user of recipient mobile device 245 may receive a message (e.g., via social media) on recipient mobile device 245. The message may include a single URL to the user sponsored media content, some of the URLs (created in connection with block 430 above), or all of the URLs (created in connection with block 430 above). Upon selection of a URL, recipient mobile device 245 may send a request to access the user sponsored media content to sponsored data enforcement device 230. In some implementations, sponsored data enforcement device 230 may receive a digital token in or with the request to access the user sponsored media content.

As further shown in FIG. 6, process 600 may include determining whether the digital token is valid (block 620). For example, sponsored data enforcement device 230 may identify an identifier, for a creator of the user sponsored media content, from token information included in the digital token. Additionally, or alternatively, sponsored data enforcement device 230 may retrieve stored token information, associated with the identifier for the creator, from a memory associated with sponsored data enforcement device 230. In some implementations, sponsored data enforcement device 230 may retrieve stored token information, associated with the identifier for the creator, from sponsored data control device 235.

Additionally, or alternatively, sponsored data enforcement device 230 may compare the token information with the stored token information. If the token information matches the stored token information, then the digital token is valid. If the token information does not match the stored token information, then the digital token is not valid.

In some implementations, sponsored data enforcement device 230 may retrieve a signing key pair, associated with the identifier for the creator, from the memory associated with sponsored data enforcement device 230. In some implementations, sponsored data enforcement device 230 may retrieve a signing key pair, associated with the identifier for the creator, from sponsored data control device 235.

Additionally, or alternatively, sponsored data enforcement device 230 may create a second digital token based on the signing key pair, using an encryption algorithm used to create the digital token. In some implementations, sponsored data enforcement device 230 may retrieve the second digital token from sponsored data control device 235.

Additionally, or alternatively, sponsored data enforcement device 230 may compare the second digital token with the digital token. If the second digital token matches the digital token, then the digital token is valid. If the second digital token does not match the digital token, then the digital token is not valid.

As further shown in FIG. 6, if the digital token is not valid (block 620 —No), then process 600 may include providing a notification that the user sponsored media content cannot be accessed (block 630). For example, sponsored data enforcement device 230 may provide a notification that the user sponsored media content cannot be accessed. In some implementations, sponsored data enforcement device 230 may provide a reason to recipient mobile device 245 so that the user of recipient mobile device 245 may understand why the user sponsored media content cannot be accessed (e.g., the digital token is not valid).

As further shown in FIG. 6, if the token is valid (block 620—Yes), process 600 may include determining whether provisioning conditions are satisfied (block 640). For example, sponsored data enforcement device 230 may determine whether one or more provisioning conditions are satisfied. Provisioning conditions may be identified in provisioning rules received from sponsored data control device 235.

As an example, a provisioning condition may specify a valid time period during which the user sponsored media content may be accessed. If the request to access the user sponsored media content is received during the valid time period, then the provisioning condition may be satisfied. If the request to access the user sponsored media content is not received during the valid time period, then the provisioning condition may not be satisfied.

As another example, a provisioning condition may specify a quantity of unused data (e.g., bytes), associated with the user sponsored account, that may be allocated for accessing the user sponsored media content. Sponsored data enforcement device 230 may determine whether there are any bytes, out of the allocated amount of bytes, available to be allocated to the request to access user sponsored media content.

For example, sponsored data enforcement device 230 may periodically request and/or may periodically receive, from sponsored data control device 235, information that identifies a quantity of available bytes (e.g., available unused data). Sponsored data control device 235 may receive information regarding used bytes from one or more sponsored data enforcement devices 230, and may update the quantity of available bytes based on the received information. If there are available bytes to be allocated to the request to access the user sponsored media content, then the provisioning condition may be satisfied. If there are no available bytes (or not enough available bytes) to be allocated to the user sponsored media content, then sponsored data enforcement device 230 may determine that the provisioning conditions are not satisfied.

As further shown in FIG. 6, if the provisioning conditions are not satisfied (block 640—No), process 600 may include providing a notification that the user sponsored media content cannot be accessed (block 630). For example, sponsored data enforcement device 230 may provide a notification that the user sponsored media content cannot be accessed. In some implementations, sponsored data enforcement device 230 may provide a reason to recipient mobile device 245 so that the user of recipient mobile device 245 may understand why the user sponsored media content cannot be accessed (e.g., the digital token is not valid based on the provisioning conditions not being satisfied).

As further shown in FIG. 6, if the provisioning conditions are satisfied (block 640—Yes), process 600 may include providing access to the user sponsored media content (block 650). For example, sponsored data enforcement device 230 may provide access to the user sponsored media content to the user of recipient mobile device 245. Additionally, or alternatively, sponsored data enforcement device 230 may provide information that causes a traffic flow, associated with the user of recipient mobile device 245 accessing the user sponsored media content, to charge data usage against the unused data allocated to the user sponsored media content. In some implementations, sponsored data enforcement device 230 may mark the traffic flow and/or packets associated with the traffic flow as being associated with the user sponsored media content.

As an example, sponsored data enforcement device 230 may provide information to PGW 225 to mark packets, associated with the traffic flow so that data charges may be charged against the unused data associated with the user sponsored account. PGW 225 may route traffic (e.g., packets) associated with a requested service (e.g., the request to access the user sponsored media content).

Additionally, or alternatively, PGW 225 and/or sponsored data enforcement device 230 may count a quantity of data (e.g., in bytes) used in association with the requested service, and may provide data usage information (e.g., that identifies a quantity of data used) to AAA 240. Additionally, or alternatively, sponsored data enforcement device 230 and/or PGW 225 may provide an instruction, to AAA 240, that causes the data used in association with the requested service to be deducted from the unused data allocated to the user sponsored account.

In some implementations, sponsored data enforcement device 230 and/or PGW 225 may provide an instruction, to AAA 240, that causes data charges, for the traffic flow associated with access to the user sponsored media content to be charged against the unused data associated with the user sponsored account, in real-time or in near real-time. In some implementations, sponsored data enforcement device 230 and/or PGW 225 may provide an instruction, to AAA 240, that causes data charges, for the traffic flow associated with access to the user sponsored media content, not to be charged against data associated with a mobile communications service plan, associated with a user of recipient mobile device 245.

Additionally, or alternatively, sponsored data enforcement device 230 and/or PGW 225 may provide an instruction, to AAA 240, that causes data charges, for the traffic flow associated with access to the user sponsored media content, that were charged against data associated with the mobile communications service plan, associated with a user of the recipient mobile device, to be credited.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

Figure 7A:
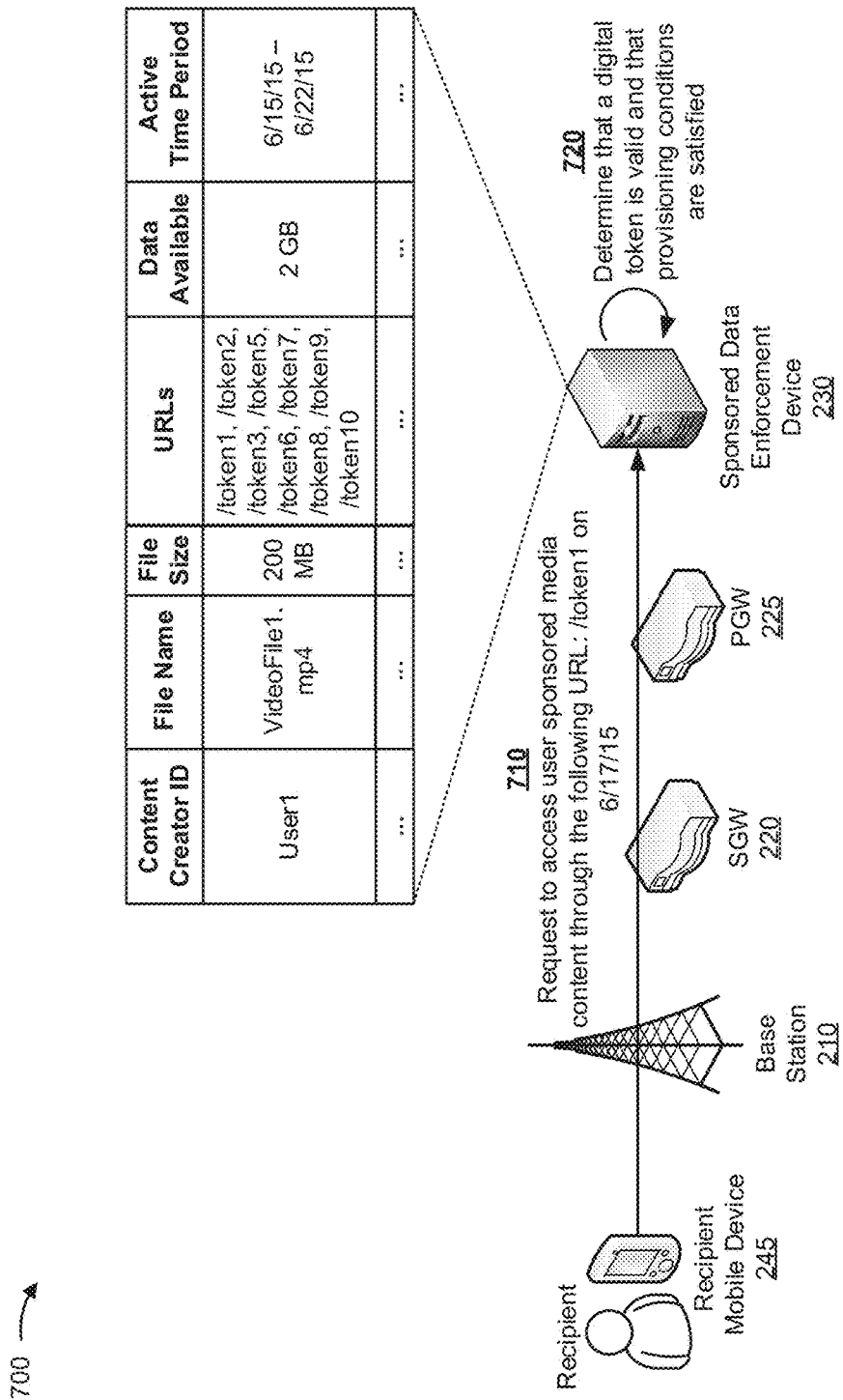
FIGS. 7A-7B are diagrams of an example implementation relating to the example process shown in FIG. 6.
Figure 7B:
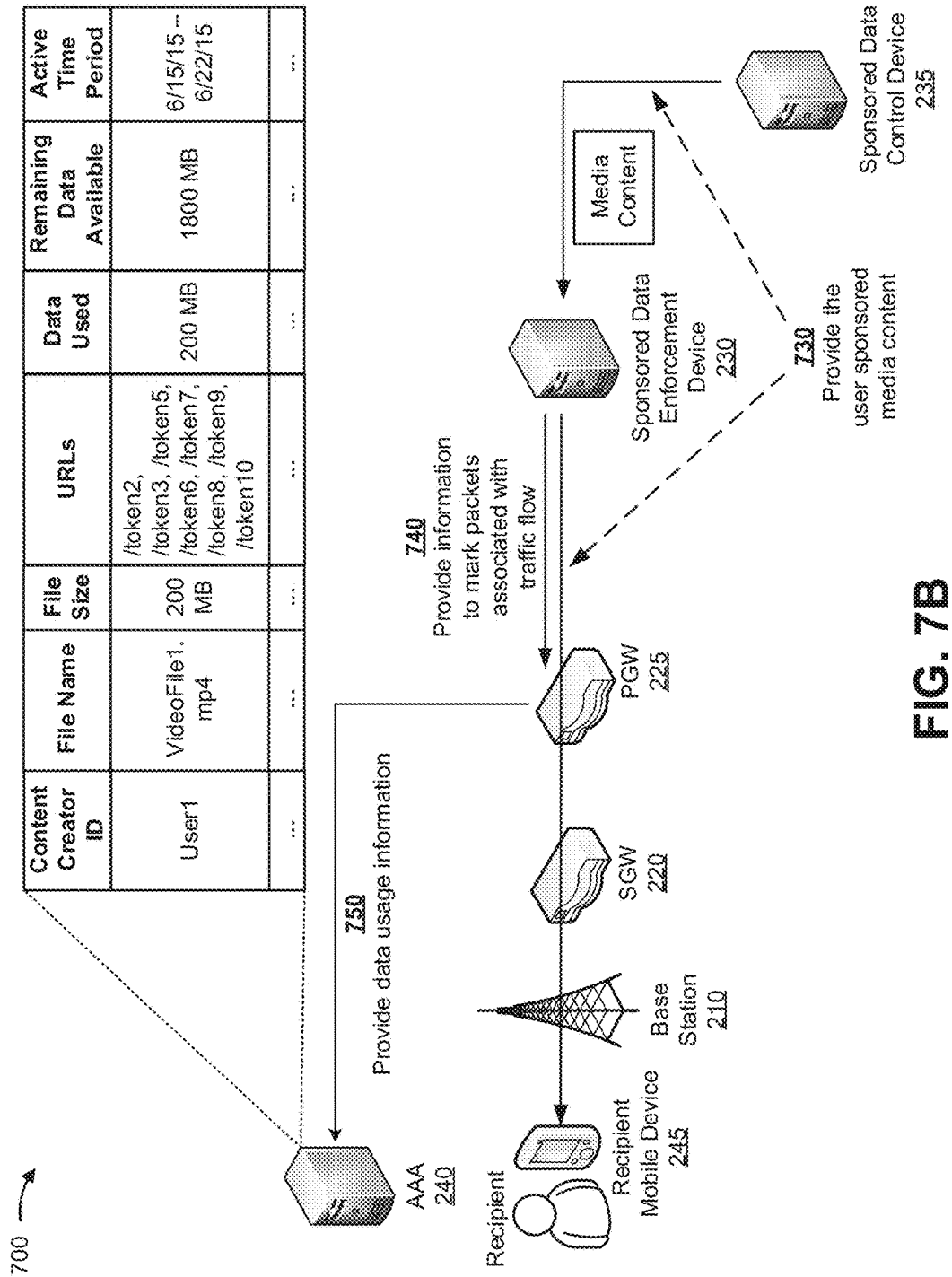

FIGS. 7A-7B are diagrams of an example implementation 700 relating to example process 600 shown in FIG. 6 and relating to diagrams of example implementation 500 shown in FIGS. 5A-5J. FIGS. 7A-7B show an example of accessing user sponsored media content.

As shown in FIG. 7A, assume a user (e.g., Recipient) of recipient mobile device 245 receives a message relating to user sponsored media content. As shown in FIG. 7A, and by reference number 710, a sponsored data enforcement device (e.g., sponsored data enforcement device 230) receives a request from the user of recipient mobile device 245 to access user sponsored media content (e.g., a video file with a file size of 200 MB), based on the user clicking on a URL link:/ token 1 provided in the message). As shown in FIG. 7A, and by reference number 720, sponsored data enforcement device 230 determines that a digital token, received with the request to access the user sponsored media content is valid and that provisioning conditions are satisfied (e.g., the request to access the user sponsored media content on 6/17/15 is within the active time period between 6/15/15 and 6/22/15; 2 GB of unused data is available, etc.).

As shown in FIG. 7B, and by reference number 730, sponsored data enforcement device 230 provides the user sponsored media content. As shown in FIG. 7B, and by reference number 740, sponsored data enforcement device 230 provides information to PGW 225 to mark packets associated with traffic flow for accessing the user sponsored media content. As shown in FIG. 7B, and by reference number 750, sponsored data enforcement device 230 and/or PGW 225 may provide data usage information to AAA 240 (e.g., AAA 240 receives data usage information and determines that 1800 MB of available unused data remains after the Recipient accesses the video file with the file size of 200 MB, using token 1).

As indicated above, FIGS. 7A-7B are provided merely as an example. Other examples are possible and may differ from what was described with regard to FIGS. 7A-7B.

By permitting a user of a mobile device to share user sponsored media content, using a user sponsored account that allows recipients of the user sponsored media content (e.g., users of recipient mobile devices) to access the user sponsored media content using the user's unused data from a mobile communications service plan, network resources of a service provider, associated with the user sponsored account and the mobile communications data plan, may be used effectively and efficiently, thereby improving the service provider's network performance.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

Certain user interfaces have been described herein and/or shown in the figures. A user interface may include a graphical user interface, a non-graphical user interface, a text-based user interface, etc. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

To the extent the aforementioned embodiments collect, store, or employ personal information provided by individuals, it should be understood that such information shall be used in accordance with all applicable laws concerning protection of personal information. Additionally, the collection, storage, and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be constructed as critical or essential unless explicitly described as such. Also, as used herein, the articles "a" and "an" are intended to include one or more items, and may be used interchangeably with "one or more." Furthermore, as used herein, the terms "group" and "set" are intended to include one or more items (e.g., related items, unrelated items, a combination of related items and unrelated items, etc.), and may be used interchangeable with "one or more." Where only one item is intended, the term "one" or similar language is used. Also, as used herein, the terms "has," "have," "having," or the like are intended to be open ended terms. Further, the phrase "based on" is intended to mean "based, at least in part, on" unless explicitly stated otherwise.

What is claimed is:

1. A system, comprising:
   one or more server devices to:
   receive a request to access user sponsored media content,
   the request including a digital token,
   the user sponsored media content being associated with a user sponsored account, and
   the user sponsored account being associated with unused data from a mobile communications service plan,
   the user sponsored account and the mobile communications service plan being associated with a user;
   identify token information included in the digital token;
   compare the token information with stored token information;
   determine that the digital token is valid based on the token information matching the stored token information;
   determine whether a quantity of unused data, allocated to the user sponsored account, is available for accessing the user sponsored media content,
   the quantity of unused data, allocated to the user sponsored account, being specified in a provisioning condition;
   determine whether the provisioning condition is satisfied,
   the provisioning condition being satisfied based on the quantity of unused data, allocated to the user sponsored account, being available;
   provide access to the user sponsored media content based on the digital token being valid and based on determining that the provisioning condition is satisfied; and
   provide information to cause data charges, for traffic flow associated with access to the user sponsored media content, to be charged against the unused data associated with the user sponsored account.

2. The system of claim 1, where the one or more server devices are further to:
   send a message to a device,
   the message including a uniform resource locator (URL) associated with the user sponsored media content,
   the request being received based on selection of the URL.

3. The system of claim 1, where the one or more server devices are further to:
   provide a notification that the user sponsored media content cannot be accessed when the digital token is not valid.

4. The system of claim 1, where the one or more server devices are further to:
   provide a notification that the user sponsored media content cannot be accessed when the provisioning condition is not satisfied.

5. The system of claim 1, where the one or more server devices are further to:
   determine that the request to access the user sponsored media content is within a valid time period, the valid time period being specified in the provisioning condition; and
where the one or more server devices, when determining whether the provisioning condition is satisfied, are to:
determine that the provisioning condition is satisfied when the request to access the user sponsored media content is within the valid time period.

6. The system of claim 1, where the one or more server devices are further to:
determine whether one or more additional instructions are satisfied,
the one or more additional instructions being specified in the provisioning condition; and
where the one or more server devices, when determining whether the provisioning condition is satisfied, are to:
determine that the provisioning condition is satisfied when the one or more additional instructions are satisfied.

7. The system of claim 1, where the one or more server devices are further to:
periodically receive information that identifies a quantity of available unused data; and
where the one or more server devices, when determining whether the provisioning condition is satisfied, are to:
determine that the provisioning condition is satisfied based on periodically receiving the information that identifies the quantity of available unused data.

8. The system of claim 1, where the one or more server devices are further to:
mark the traffic flow or packets associated with the traffic flow as being associated with the user sponsored media content.

9. A computer-readable medium storing instructions, the instructions comprising:
one or more instructions that, when executed by one or more processors, cause the one or more processors to:
receive a request to access user sponsored media content,
the request including a digital token,
the user sponsored media content being associated with a user sponsored account, and
the user sponsored account being associated with unused data from a mobile communications service plan,
the user sponsored account and the mobile communications service plan being associated with a user;
identify token information included in the digital token;
compare the token information with stored token information;
determine that the digital token is valid based on the token information matching the stored token information;
determine whether a quantity of unused data, allocated to the user sponsored account, is available for accessing the user sponsored media content,
the quantity of unused data, allocated to the user sponsored account, being specified in a provisioning condition;
determine that the provisioning condition is satisfied based on the quantity of unused data, allocated to the user sponsored account, being available;
provide access to the user sponsored media content based on the digital token being valid and the provisioning condition being satisfied; and
provide information to cause data charges, for traffic flow associated with access to the user sponsored media content, to be charged against the unused data associated with the user sponsored account.

10. The computer-readable medium of claim 9, where the one or more instructions, when executed by the one or more processors, further cause the one or more processors to:
identify an identifier for a creator from the token informational included in the digital token;
retrieve a signing key pair associated with the identifier for the creator; and
create a second digital token using the signing key pair; and
where the one or more instructions, that cause the one or more processors to determine that the digital token is valid, cause the one or more processors to:
determine that the digital token is valid based on the digital token matching the second digital token.

11. The computer-readable medium of claim 10, where the digital token and the second digital token are created using an encryption algorithm.

12. The computer-readable medium of claim 9, where the one or more instructions, when executed by the one or more processors, further cause the one or more processors to:
instruct a device to mark packets associated with a traffic flow in connection with access to the user sponsored media content.

13. The computer-readable medium of claim 9, where the one or more instructions, when executed by the one or more processors, further cause the one or more processors to:
provide a message to one or more recipient mobile devices,
the message including a uniform resource locator associated with the user sponsored media content; and
where the one or more instructions, that cause the one or more processors to receive the request to access the user sponsored media content, cause the one or more processors to:
receive the request to access the user sponsored media content based on a user of the one or more recipient mobile devices interacting with the uniform resource locator.

14. The computer-readable medium of claim 13, where the uniform resource locator includes the digital token.

15. A method, comprising:
receiving, by a device and from a recipient mobile device, a request to access user sponsored media content,
the request including a digital token,
the user sponsored media content being associated with a user sponsored account, and
the user sponsored account being associated with unused data from a mobile communications service plan,
the user sponsored account and the mobile communications service plan being associated with a user;
comparing, by the device, token information, associated with the digital token, with stored token information;
determining, by the device, that the digital token is valid based on the token information matching the stored token information;
determining, by the device, whether a quantity of unused data, allocated to the user sponsored account, is available for accessing the user sponsored media content,
the quantity of unused data, allocated to the user sponsored account, being specified in a provisioning condition;

determining, by the device, that the provisioning condition is satisfied based on the quantity of unused data, allocated to the user sponsored account, being available;

providing, by the device and to the recipient mobile device, access to the user sponsored media content based on the digital token being valid and the provisioning condition being satisfied; and providing, by the device, information to cause data charges, for traffic flow associated with access to the user sponsored media content, to be charged against the unused data associated with the user sponsored account.

16. The method of claim 15, where the information to cause data charges, for traffic flow associated with access to the user sponsored media content, to be charged against the unused data associated with the user sponsored account is provided in real-time or in near real-time.

17. The method of claim 15, further comprising:
providing information to cause data charges, for traffic flow associated with access to the user sponsored media content, not to be charged against data associated with the mobile communications service plan associated with a user of the recipient mobile device.

18. The method of claim 15, further comprising:
providing information to cause data charges, for traffic flow associated with access to the user sponsored media content, that were charged against data associated with the mobile communications service plan, associated with a user of the recipient mobile device, to be credited.

19. The method of claim 15, where the user sponsored media content is at least one of:
a video file,
an audio file, or
image file.

20. The method of claim 15, further comprising:
sending a message to a device,
the message including a uniform resource locator (URL) associated with the user sponsored media content, and
the request being received based on selection of the URL.

* * * * *